United States Patent [19]
Elsworth

[11] 3,861,543
[45] Jan. 21, 1975

[54] BOX POSITIONING APPARATUS AND METHOD FOR USE THEREOF

[75] Inventor: Robert M. Elsworth, Loudonville, N.Y.

[73] Assignee: General Electric Co., Waterford, N.Y.

[22] Filed: Jan. 21, 1974

[21] Appl. No.: 435,040

[52] U.S. Cl............... 214/303, 198/20 R, 198/164, 198/168, 214/1 Q, 214/152
[51] Int. Cl. ... B65g 59/06, B65g 47/24, B65g 47/52
[58] Field of Search ........... 198/236, 237, 238, 241, 198/162, 164, 168, 171, 20 R; 214/1 Q, 1 QE, 300, 303, 307, 152

[56] References Cited
UNITED STATES PATENTS
2,776,831  1/1957  Shields............................. 214/1 Q
3,575,278  4/1971  Hoffman............................ 198/164

Primary Examiner—Evon C. Blunk
Assistant Examiner—Jeffrey V. Nase
Attorney, Agent, or Firm—Donald J. Voss, Esq.; George B. Finnegan, Jr., Esq.; Edward A. Hedman

[57] ABSTRACT

Boxes filled with cylindrical containers are positioned and advanced to a reservoir pocket for feeding a filling line conveyor by (a) transferring the boxes, open at the top, into a box tipper comprising unitary top, bottom, back and end sides, having an open front side, and adapted to pivot 180° about the edge formed by the top and back sides, (b) pivoting the box tipper a full 180° to invert the boxes and their contents, (c) transferring the boxes and their contents onto a conveying means, (d) advancing them to a position above a filling conveyor and (e) feeding the containers by gravity from the boxes onto the filling conveyor.

10 Claims, 4 Drawing Figures

BOX POSITIONING APPARATUS AND METHOD FOR USE THEREOF

This invention relates to an automatic box positioner and to a method for the use thereof. More particularly, it relates to a box tipper, adapted to receive boxes of cylindrical containers and to position them on a transfer surface, on which they are advanced to a location for unloading the contents onto a conveyor for feeding a filling production line.

BACKGROUND OF THE INVENTION

In the past, cylindrical containers, such as cans, bottles, empty caulking cartridges, and the like, have been received, unpacked, then manually positioned onto conveyors feeding filling production lines. This handling required at least one full time operator, and usually more, and the speed of the filling operations were limited by the speed with which the shipping cartons could be manually unpacked and the containers transferred to the production line. By way of illustration, manual handling limits the amount of caulkers which can be handled in each box to less than 300. Although production filling lines have a much greater capacity to accept the containers, the limiting factor is manual box positioning and feeding, and therefore it is desirable to provide a means for automatically feeding such lines at a much higher rate. Automatic means are also desirable because they avoid the need for operators to hoist heavy boxes and to rapidly position hundreds of small containers in parallel alignment, which is necessary to avoid jamming downstream.

This invention has been developed to automatically receive at least one and, preferably a large number of boxes each in turn holding hundreds, e.g., greater than 400, cylindrical containers. The invention will be described with particular reference to transferring caulking cartridges, of the type familiarly seen, which are cylindrical, of about 1½ inches in diameter and about 9 inches long, open at one end. These are filled with caulking composition and then the open end is sealed, in well known fashion. In particular, four boxes of 483 cartridges per box are easily handled, according to this invention, with a minimum of attention, by one operator. For example, if the boxes are held on a pallet, the box tipper of this invention can be used to receive the boxes at the pallet level, turn them upside down, and present them at a higher level onto a conveyor table which includes means to advance the boxes to an emptying mechanism. As soon as the boxes are emptied, they are then automatically removed and replaced by a full box, in preferred embodiments.

The apparatus and method of this invention, once loaded with a full complement of boxes, will provide a long term supply of containers to the filling conveyor without further attention. This permits one man to monitor a subsequent operation, e.g., printing and labelling, after filling the beginning of the production line with empty caulkers, and it eliminates the need for a second man as has been required heretofore with a fully manual operation.

DESCRIPTION OF THE DRAWINGS

The invention will be better understood by reference to the accompanying drawings in which.

DESCRIPTION OF THE INVENTION

According to this invention, there is provided a box tipper including unitary top and bottom sides, unitary end sides, a unitary back side, and an open front side, and being adapted to pivot through 180° about the edge formed at the junction of the top and the back sides, said box tipper being adapted to receive at least one box open at the top and containing empty cylindrical containers disposed within the box, the axes of each such container being aligned parallel to the direction of rotation of said box tipper.

Also contemplated by this invention are means for holding each said box in proper alignment prior to transfer into the box tipper; and means for conveying the tipped boxes from the tipper into position over a discharge reservoir which feeds a filling conveyor. Also a feature of the invention is a conveyor for taking away empty boxes.

In a preferred feature, the present invention contemplates a method for receiving boxes containing a plurality of cylindrical containers, for positioning said boxes over a conveyor feeding line, and for feeding the cylindrical containers from said boxes into a filling production line, said method comprising:

a. providing a plurality of boxes open at the top and containing a plurality of cylindrical containers;

b. transferring at least one box and its contents into a box tipper comprising unitary top and bottom sides, unitary end sides, a unitary back side, and an open front side, and being adapted to pivot through 180° about the edge formed at the junction of the top and the back side, each said box being positioned in the box tipper so that the axes of the empty cylindrical containers in the box are aligned parallel to the direction of rotation of said box tipper;

c. causing said tipper to be pivoted about the edge joining its top side and its back side through an arc of 180° so as also to turn each said box and its contents 180° while raising it to the height of a conveying means in registry therewith, each said box resting on its open end, having been turned upside down;

d. transferring each said box and its contents from the box tipper onto said conveying means;

e. advancing each said box and its contents to a location above a trap door covering a reservoir pocket;

f. opening the trap door under said box and its contents so as to permit the cylindrical containers to feed by gravity into the reservoir pocket and then onto a filling line conveyor belt; and, when empty, g. transferring said box to a take away conveyor belt.

DESCRIPTION OF THE PREFERRED EMBODIMENTS

Figure 1:
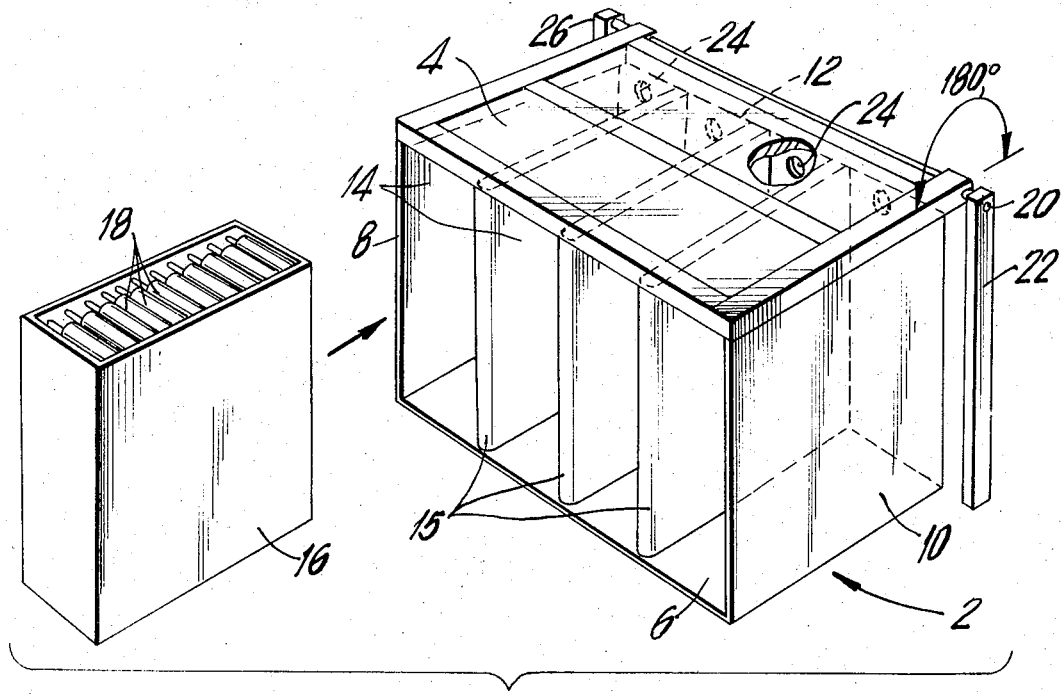
FIG. 1 is a perspective view of a box tipper according to this invention which is adapted to receive four boxes, one of which is shown, the box being open at the top and filled with empty cylindrical containers.

Referring to FIG. 1, there is illustrated a box tipper 2 according to this invention which can be constructed from any conventional material, such as sheet metal, wood, plastic or the like, and which comprises unitary top side 4, unitary bottom side 6 and unitary end sides 8 and 10. Back side 12 is unitary and front side 14 is open. Open front face 14 is adapted to receive at least one box 16 open at the top and filled with cylindrical containers 18 which are to be filled during the operation. In the embodiment shown, box tipper 2 is adapted to receive a plurality of boxes, namely four, by being divided into four pockets by three vertical unitary dividers 15. Box tipper 2 is adapted to pivot through 180° on an axis parallel to the edge where top 4 and back 12 meet. Tipping is around axle 20 which is supported by end posts 22 and 26. Also shown in FIG. 1 are optional apertures 24 in each of the pockets formed in box tipper 2. These are adapted to receive push rods inserted therethrough, and aid in discharging the filled boxes after they have been turned upside down by rotation of the box tipper.

Also in FIG. 1, is shown box 16 in which a multitude, e.g., 475–485, of empty caulkers are packed with their longitudinal axes located so as to be ultimately parallel to the axis of rotation of box tipper 2 when box 16 has been loaded into a pocket through open face 14. It can be seen that after the box has been placed in its pocket, and the box tipper has been pivoted around its upper rear edge through an arc of 180°, box 16 will have been turned 180° also and at the same time raised to a level substantially equivalent to the distance between the top and bottom faces of box tipper 2. Each of boxes 16 in the fully tipped position will now rest on its open end having been turned upside down. Top side 4 will serve as a floor for box 16 in this position. As will be described later, a receiving table can be provided at the appropriate height and boxes 16 can then be pushed out of the pockets in the box tipper by hand, or by other mechanical means, such as the operation of a long push rod inserted through optional opening 24. The inverted boxes will roll smoothly onto such a table by the rotary motion of the cylindrical containers therewithin.

Figure 3:
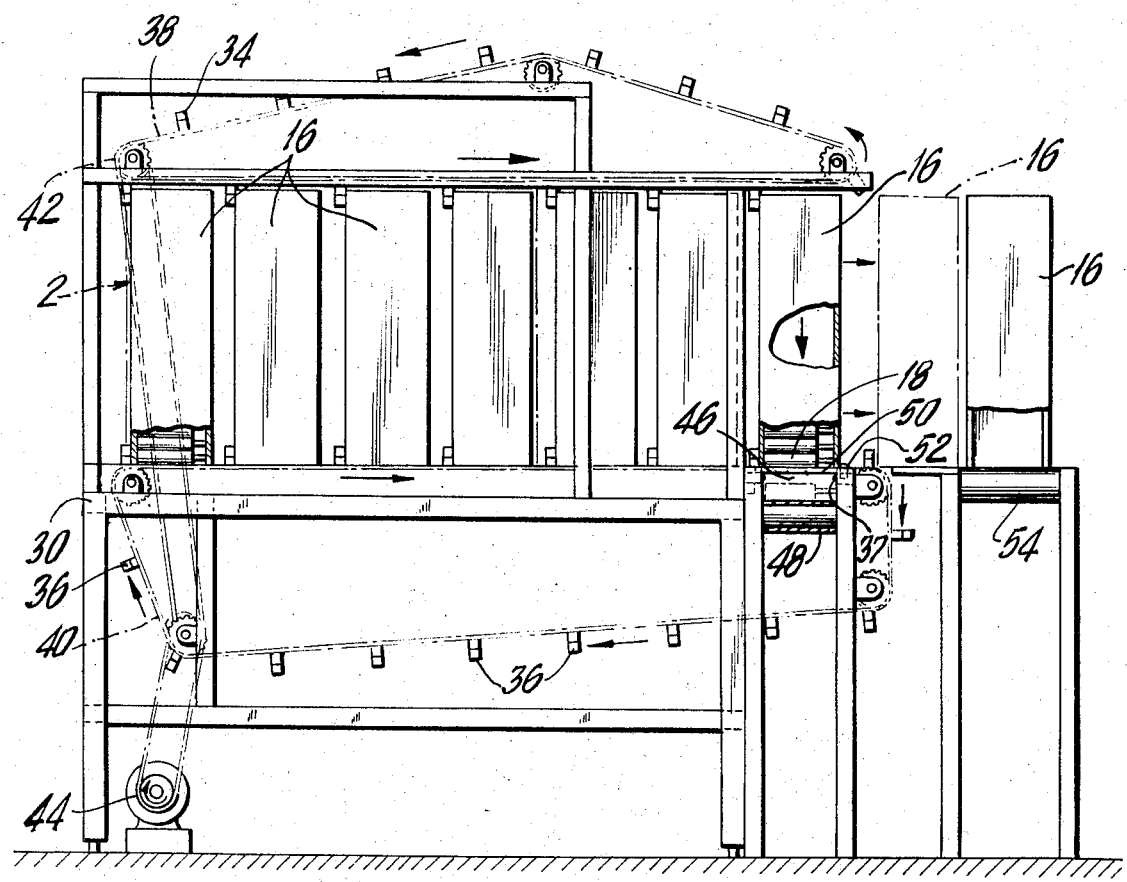
FIG. 3 is a front view of the box positioning and conveying apparatus of FIG. 2, in elevation, showing the conveying table, eight boxes, a reservoir pocket for receiving cylindrical containers above a filler line conveying belt, and a conveying belt for removing the boxes when empty.
Figure 2:
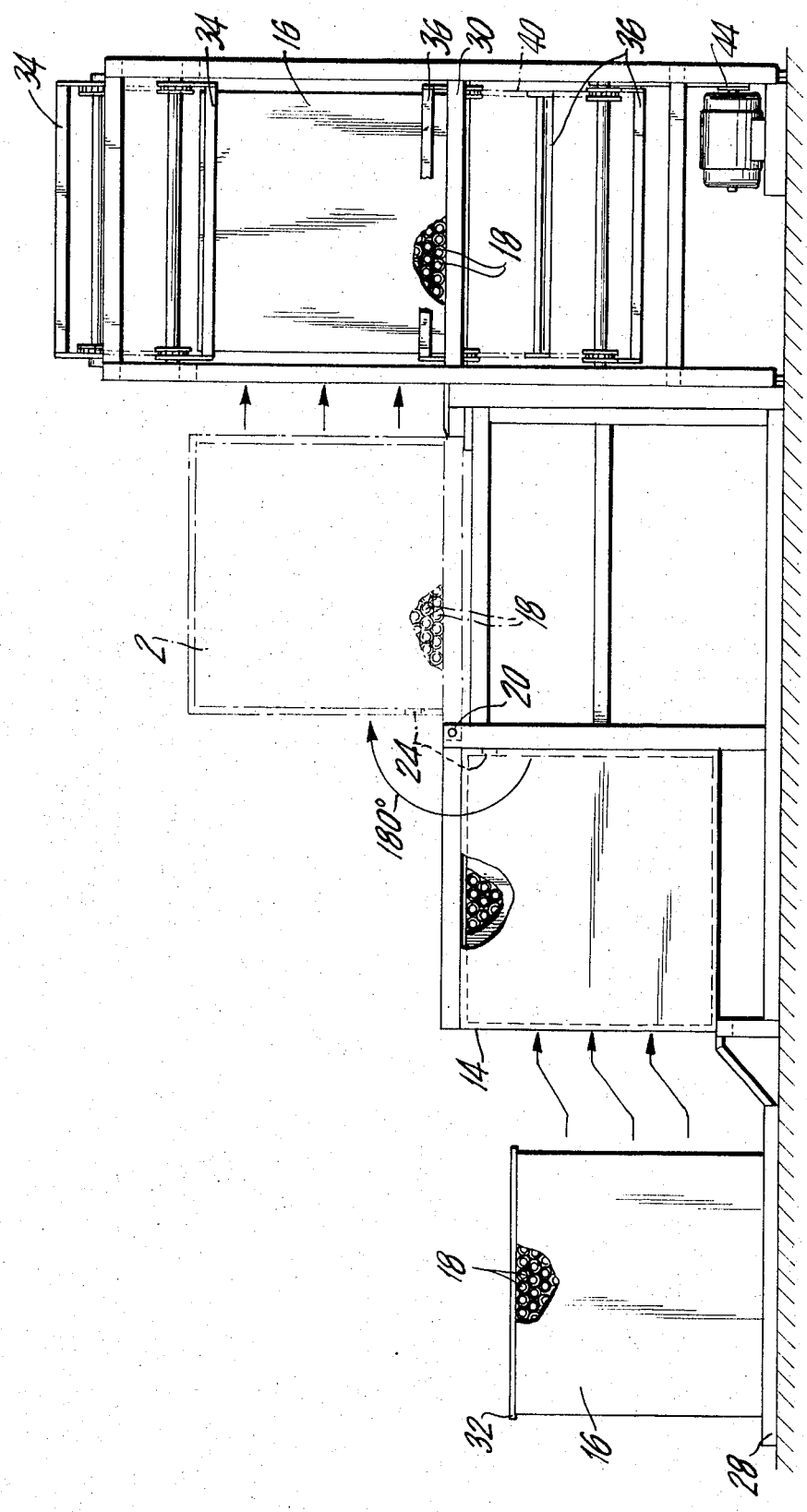
FIG. 2 illustrates a side view of an apparatus according to this invention showing a box holding means; the box tipper of FIG. 1 (shown fully tipped in phantom) and a conveying table for the boxes and their contents after tipping.
Figure 4:
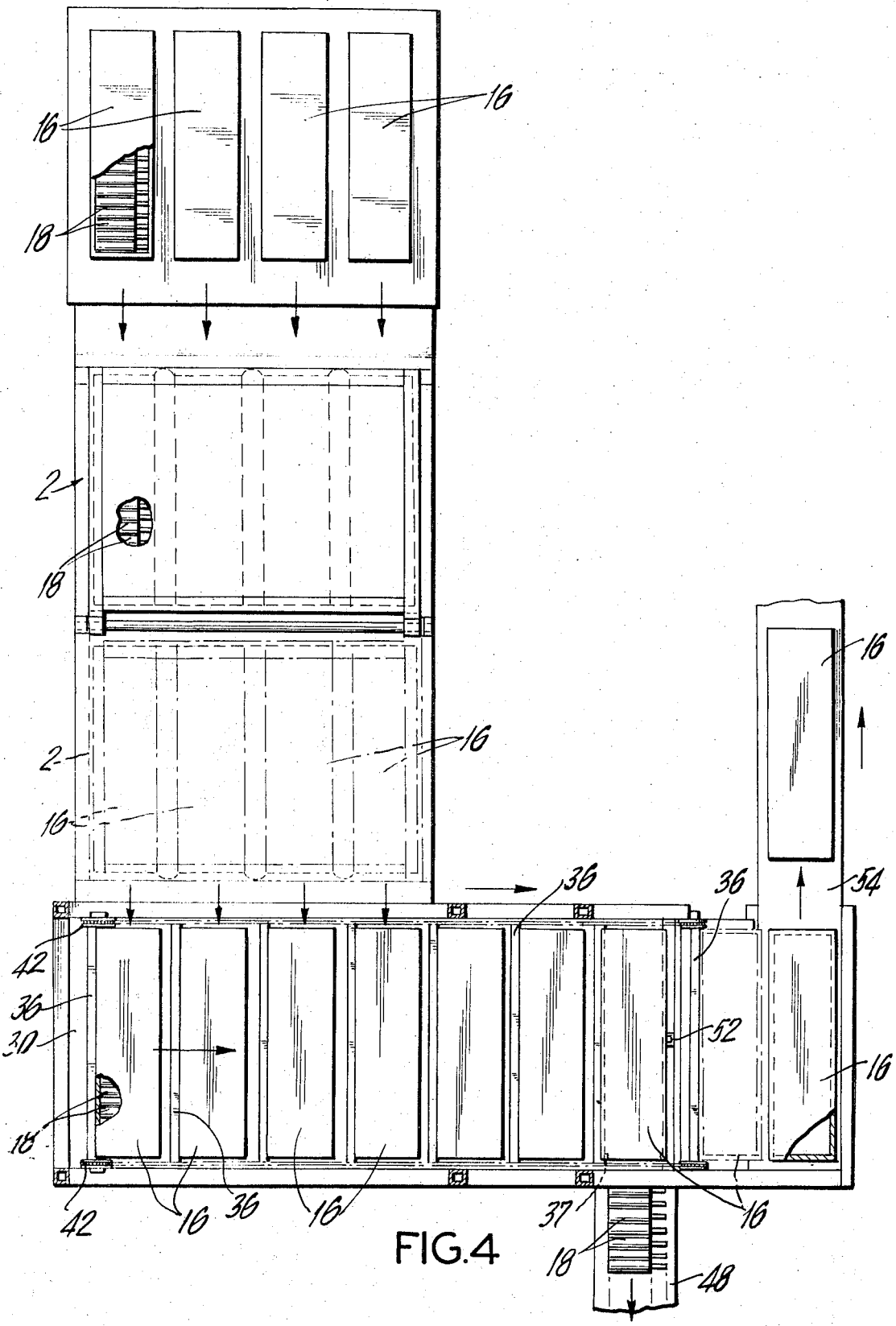
FIG. 4 is a view looking down from above onto the box positioning and conveying apparatus of FIGS. 2 and 3, showing the direction of travel of individual boxes, push rods on the conveying table, and a box in position for feeding the filler line conveying belt.

FIGS. 2–4 illustrate a box positioning, advancing and discharging apparatus according to this invention, showing pallet or similar means 28 to hold at least one box 16 and its contents comprising a plurality of containers 18. Box positioner 2 is shown in the receiving position and is also shown in phantom as it will appear after rotation about axle 20 through a full 180° into the discharge position. Conveyor table 30 is shown downstream, holding another box 16, filled with containers 18 and resting with its open end down on the surface of the table.

The method of the present invention can be best understood by considering FIGS. 2, 3, and 4 in order. In FIG. 2, box 16 is shown stored on pallet 28, with three boxes behind (not shown), an having common cardboard top 32 covering the open ends of all four boxes. Then top 32 is removed and all four boxes 16 are slipped into the respective four pockets on box tipper 2. These four pockets are open on vertical face 14 and they are pivotable about their upper rear corners about axle 20 so that they are movable through an arc of 180°. In the next step, box tipper 2 is rotated through the 180° arc thus turning boxes 16 and their contents 180° while raising them to the height of receiving conveyor table 30. This is shown in phantom in FIG. 2. where it is seen that each of boxes 16 is now resting on its open end having been turned upside down. In the next step, each of boxes 16 is now pushed out of the pockets, for example, by means of push rods inserted through optional openings 24 in which was formerly back wall 4 of box tipper 2. The pushing out of boxes 16 moves them smoothly by rotation of cylindrical containers 18 onto table 30 (FIGS. 3 and 4). These are advanced along table 30 by mechanical means. One preferred embodiment comprises the use of conveying means comprising top push rod 34 and bottom push rod 36 attached to respective conveying chains 38 and 40 at intervals equivalent to slightly greater than the width of box 16. Upper and lower conveyor chains 38 and 40 are tied together by gears and chain sprockets 42 and are driven by motor 44 so that they move as one. For fully automatic operation, on a signal from a low level indicator 37 which is, for example, a photoelectric cell seeing a beam of light, conveyor chains 38 and 40 and their associated horizontal push rods 34 and 36 are advanced automatically a distance sufficient to position the next box. This positions full box 16 of empty caulkers 18 over conveyor feed reservoir 46 and conveyor feed belt 48. Sliding trap door 50 in the same elevation with table 30 serves to hold caulkers 18 in place in box 16 until the box is fully aligned over reservoir pocket 46. Then switch 52 is tripped by box 16 and trap door 50 is pulled from under the open end of the box, allowing empty caulkers to feed by gravity into reservoir pocket 46. Box 16 now becomes part of the reservoir too.

In the next step, and referring to FIG. 4, as box 16 over the reservoir becomes empty, the low level indicator 37 again sees a beam of light and actuates motor 44 to drive conveyor chains 38 and 40 and horizontal push rods 34 and 36 again automatically to advance one box. The new filled box pushes the empty box through a normally empty position, shown in phantom, which, in turn, pushes its preceding box onto take away conveyor belt 54. At the end of belt 54, the empty boxes are preferably collapsed and especially preferably processed for reuse.

In the system shown, caulking cartridges are packed 483 to a box and, when positioned over the reservoir, the reservoir pocket itself provides a 2-minute supply of empty cartridges to a high speed filling line, at which time the low level indicator calls for a new supply. It can be seen that the present method allows the positioning of seven boxes on the conveyor table with four more in the box tipper 2 ready to be slid into empty conveyor slots, as they become available. The system shown provides an 88-minute supply of caulking cartridges without further attention.

The above detailed description makes it clear that the present apparatus and method provides a useful and economical positioner for boxes of empty cylindrical containers, such as cans, bottles, caulking cartridges, and the like. Obviously, many modifications will suggest themselves to those skilled in the art in view of this specification and the drawings. The appended claims are intended to cover this invention and all of its obvious variations.

I claim:

1. A box tipper including unitary top and bottom sides, unitary end sides, a unitary back side, and an open front side, and being adapted to pivot through 180° about the edge formed at the junction of the top and the back sides, said box tipper being adapted to receive at least one box open at the top and containing empty cylindrical containers disposed within the box, the axes of each such container being aligned parallel to the direction of rotation of said box tipper.

2. A box tipper as defined in claim 1 including at least one vertical unitary planar divider therewithin, each said divider being aligned parallel to the end sides so as to divide said box tipper into at least two box receiving pockets.

3. A box tipper as defined in claim 1 wherein the back side has an aperture into which a push rod can be introduced to discharge a box contained within said box tipper, when said tipper has been pivoted 180° into discharge position.

4. An apparatus for receiving at least one box open at the top and containing a plurality of cylindrical containers, for positioning each said box over a conveyor feeding line, and for discharging said containers from said box into a filling production line, said apparatus comprising:
   a. loading means for holding each said box in parallel alignment;
   b. a box tipper comprising unitary top and bottom sides, unitary end sides, a unitary back side, and an open front side, and being adapted to pivot through 180° about the edge formed at the junction of the top and the back sides, said box tipper being adapted to receive each said box so that the axes of the empty cylindrical containers in the box are aligned parallel to the direction of rotation of said box tipper; and
   c. conveying means in registry with said box tipper when fully pivoted 180° into discharge position for receiving each said box and advancing it to a conveyor feeding line.

5. An apparatus as defined in claim 4 wherein said conveying means comprises a conveyor table at the height of the box tipper when said tipper has been fully pivoted 180° into discharge position, and a plurality of horizontal push rods on said table in registry with said box tipper for receiving the lower portion and advancing each said box.

6. An apparatus as defined in claim 5 which also includes horizontal push rods above said table, in registry with the push rods on said table, so as to receive the upper portion and advance each said box.

7. An apparatus as defined in claim 5 wherein said conveyor table includes, downstream, a reservoir pocket for feeding said containers to a filling line conveyor belt, said reservoir pocket being disposed below a sliding trap door in the table surface, said trap door being adapted to open when a box holding said cylindrical containers is positioned over the reservoir pocket.

8. An apparatus as defined in claim 7 in which the conveyor table terminates downstream in a take away conveyor belt for removing empty boxes.

9. A method for receiving boxes containing a plurality of cylindrical containers, for positioning said boxes over a conveyor feeding line, and for feeding the cylindrical containers from said boxes into a filling production line, said method comprising:
   a. providing a plurality of boxes open at the top and containing a plurality of cylindrical containers;
   b. transferring at least one box and its contents into a box tipper comprising unitary top and bottom sides, unitary end sides, a unitary back side, and an open front side, and being adapted to pivot through 180° about the edge formed at the junction of the top and the back side, each said box being positioned in the box tipper so that the axes of the empty cylindrical containers in the box are aligned parallel to the direction of rotation of said box tipper;
   c. causing said tipper to be pivoted about the edge joining its top side and its back side through an arc of 180° so as also to turn each said box and its contents 180° while raising it to the height of a conveying means in registry therewith, each said box resting on its open end, having been turned upside down;
   d. transferring each said box and its contents from the box tipper onto said conveying means;
   e. advancing each said box and its contents to a location above a trap door covering a reservoir pocket;
   f. opening the trap door under said box and its contents so as to permit the cylindrical containers to feed by gravity into the reservoir pocket and then onto a filling line conveyor belt; and, when empty,
   g. transferring said box to a take away conveyor belt.

10. A method as defined in claim 9 including the step of advancing each said box after discharge from the box tipper along a conveyor table into location over the reservoir pocket by means of a chain driven horizontal push rod.

* * * * *